United States Patent [19]

Yamazaki

[11] Patent Number: 4,533,020

[45] Date of Patent: Aug. 6, 1985

[54] THREE-UNIT ASSEMBLY FOR PNEUMATIC CIRCUIT

[75] Inventor: Masamichi Yamazaki, Tokyo, Japan

[73] Assignee: Shoketsu Kinzoku Kogyo Kabushiki Kaisha, Tokyo, Japan

[21] Appl. No.: 510,193

[22] Filed: Jul. 1, 1983

[30] Foreign Application Priority Data

Jul. 6, 1982 [JP] Japan .................................. 57-101273

[51] Int. Cl.³ ........................ F16L 15/00; F16N 21/00
[52] U.S. Cl. .................................. 184/55.2; 184/6.24; 184/6.26; 285/325; 285/364
[58] Field of Search ..................... 184/6.21, 6.24, 6.25, 184/6.26, 55 R, 55 A, 56 R, 56 A, 105 R; 285/325, 364, 406; 137/237

[56] References Cited

U.S. PATENT DOCUMENTS

| | | | |
|---|---|---|---|
| 2,934,104 | 4/1960 | Burton et al. | 184/105 R |
| 3,372,949 | 3/1968 | McLay | 285/364 |
| 3,390,901 | 7/1968 | Bibb | 285/406 |
| 3,559,764 | 2/1971 | Wheeler | 184/55 A |
| 4,070,045 | 1/1978 | Colter et al. | 285/325 |
| 4,082,324 | 4/1978 | Obrecht | 285/364 X |
| 4,289,335 | 9/1981 | Olbermann | 285/364 X |
| 4,352,511 | 10/1982 | Ribble et al. | 285/364 X |

FOREIGN PATENT DOCUMENTS

| | | | |
|---|---|---|---|
| 0047351 | 3/1982 | European Pat. Off. | 285/325 |
| 2470912 | 6/1981 | France | 285/325 |

Primary Examiner—David H. Brown
Assistant Examiner—John E. Griffiths
Attorney, Agent, or Firm—Birch, Stewart, Kolasch & Birch

[57] ABSTRACT

A three-unit assembly for a pneumatic circuit includes a filter, a regulator and a lubricator, each having a body portion providing an air passageway therethrough. The air passageway of each terminates at respective inlet and outlet ports. Each of these engagement portions being provided adjacent to the inlet and outlet ports and including sloping engagement faces which come together in a somewhat V-shape, and face generally axially opposite the direction in which their respective inlet or outlet port opens. Coupling members are provided with passageways providing communication between the outlet port of one of the filter, regulator and lubricator and the inlet port of the next adjacent one of the filter, regulator and lubricator. Each of the coupling members including a pair of threaded bores which extend generally transversely to the coupling member's passageway. Pair-striding members for joining the coupling members and the filter, regulator and lubricator and including a center portion providing a passageway through which a bolt is inserted to engage a threaded opening provided on the coupling member. Each striding member including engagement faces which intersect each other in somewhat the same V-shaped orientation as the engaging faces on a respective filter, regulator or lubricator projection.

4 Claims, 1 Drawing Figure

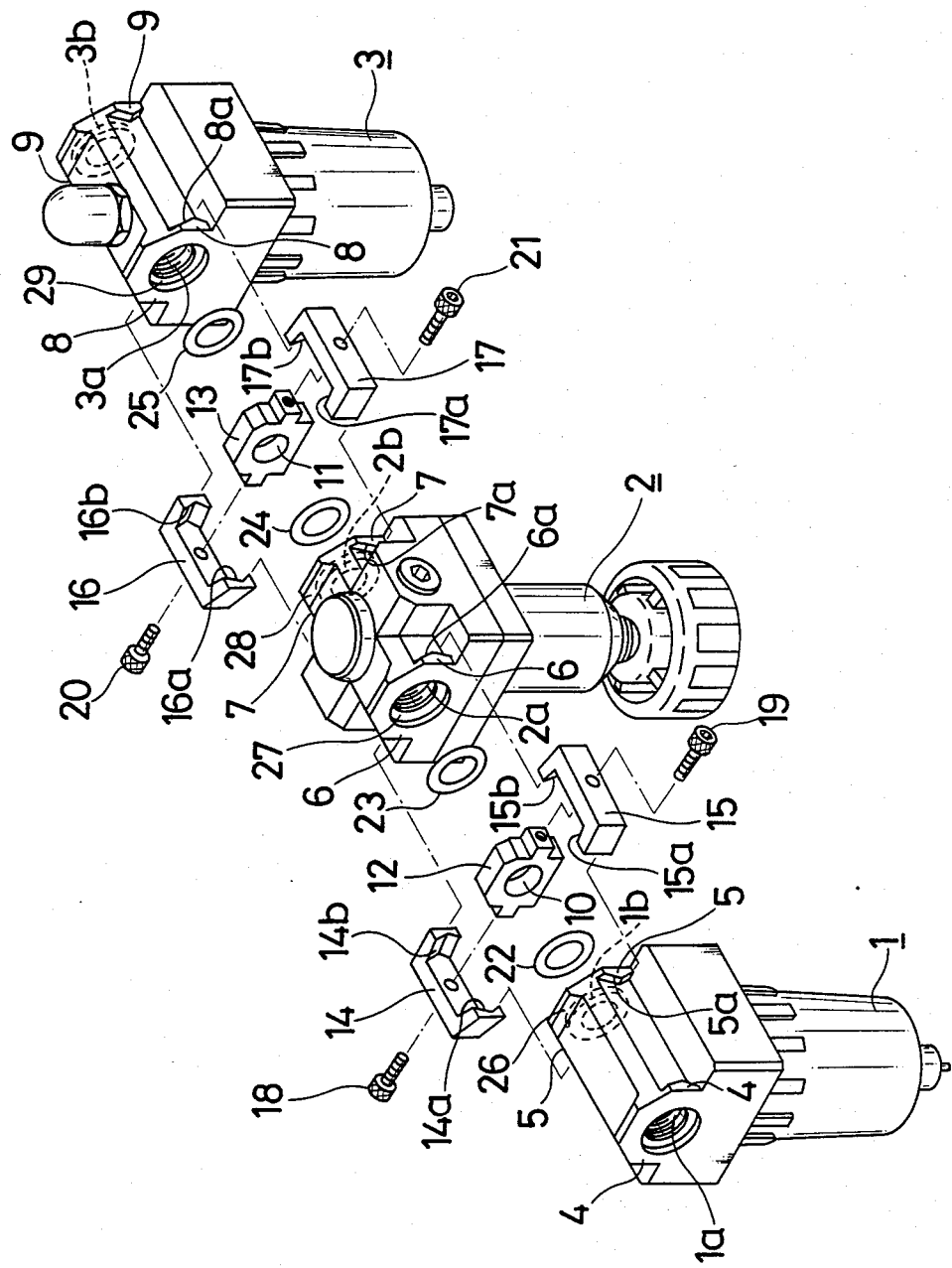

THREE-UNIT ASSEMBLY FOR PNEUMATIC CIRCUIT

BACKGROUND OF THE INVENTION

1. Field of the Invention

A pneumatic circuit, particularly one which supplies a lubricant in an atomized form to portions of an apparatus requiring lubrication, usually incorporates a filter for cleaning supply air, a regulator for regulating the pressure of a flow and a lubricator for forcing out a lubricant in the atomized form into a pressurized pneumatic stream. These units are provided as a set, commonly termed a three-unit assembly.

2. Description of Background Art

Hitherto, individual units in a three-unit assembly, i.e., a filter, regulator and lubricator, have been fabricated independently without any relation provided to one another. The independent units have been connected to one another using complicated pipings and connecting means. Therefore, if one of the units is to be replaced or repaired, the three-unit assembly itself must be removed from the circuit for the replacement or repair. This has been very inconvenient. Further, the assembly includes a comparatively large number of component parts, and its cost is considerably high.

SUMMARY AND OBJECTS OF THE INVENTION

According to the present invention, the individual units constituting the three-unit assembly noted above are coupled together using coupling members having a simple shape with only an O-ring provided between adjacent components for the purpose of sealing. Thus, only a unit which is to be replaced or repaired can be simply removed, so that it is possible to greatly reduce the labor and time required for the replacement or repair. In addition, the number of components can be reduced, which is desired from the standpoint of economy. Thus, the utility of the three-unit assembly can be extremely improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein:

The accompanying drawing is an exploded perspective view showing a three-unit assembly according to the present invention.

DETAILED DESCRIPTION OF THE PREFERRED EMBODIMENT

In the drawing, reference numeral 1 designates a filter; 2 a regulator; 3 a lubricator; 1a, 1b, 2a, 2b, 3a and 3b ports; 4, 5, 6, 7, 8 and 9 sidewise projections; 12 and 13 coupling members; 14, 15, 16 and 17 striding members; 14a, 14b, 15a, 15b, 16a, 16b, 17a and 17b engaging surfaces and 22, 23, 24 and 25 O-rings.

The drawing is a perspective view showing a three-unit assembly for a pneumatic circuit according to the present invention. The illustrated three-unit assembly comprises a filter 1, a regulator 2 and a lubricator 3. These units have the same construction and function as the conventional units and, therefore, are not described in detail. According to the present invention air inlet and outlet ports 1a to 3a and 1b to 3b of these units 1 to 3 are aligned with respect to one another, that is, they are disposed in a straight line. Pairs of sidewise projections 4 to 9 are provided at the respective inlets and outlet ports. Sidewise projections 4–9 of each pair are symmetrically provided on the opposite sides of each inlet or outlet port 1a–3a and 1b–3b.

A coupling member 12 is interposed between the adjacent ports 1b and 2a, and another coupling member 13 is interposed between the adjacent ports 2b and 3a. These coupling members 12 and 13 have respective central communicating holes 10 and 11 which communicate with the associated ports. Substantially channel-shaped striding members 14 to 17 are provided in pairs such that they stride the opposite sides of the coupling members 12 and 13 in the axial direction thereof. They are bolted by bolts 18 to 21 to the opposite sides of the associated coupling members 12 and 13. They have respective pairs of engaging surfaces 14a and 14b, 15a and 15b, 16a and 16b, and 17a and 17b, which are adapted to engage with engagement faces 5a, 6a, 7a and 8a of the corresponding sidewise projections 5 to 8. The engagement faces 5a, 6a, 7a and 8a each have two faces joining each other to define a V-shaped sectional profile. The engaging surfaces 14a, 14b, 15a, 15b, 16a, 16b, 17a and 17b each have two faces joining each other to define a V-shaped profile complementary to the V-shaped engagement face noted above. The V-shaped engagement faces and V-shaped engagement portions are inclined with respect to normal planes to the axis of the assembly such that the individual units are pulled together by the striding members 14 to 17 when they are assembled. O-rings 22 to 25 are interposed and compressed between the opposite end faces of the coupling members 12 and 13 and the corresponding end faces of the ports 1b, 2a, 2b and 3a. These O-rings 22 to 25 are partly fitted in respective annular recesses 26 to 29 formed in the end faces of the ports 1b, 2a, 2b and 3a and surrounding the openings thereof. The three-unit assembly for a pneumatic circuit described above according to the present invention, can solve the problems noted before inherent in the prior art three-unit assembly, so that it is very beneficial in the industry.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A three-unit assembly for a pneumatic circuit, comprising:
   a filter including an inlet port and an outlet port;
   a regulator including an inlet port and an outlet port;
   a lubricator including an inlet port and an outlet port;
   each of said filter, regulator and lubricator including
      a portion for defining an air passage between said inlet port and said outlet port thereof, respectively, each air passage defining portion including a pair of projections extending oppositely from each other adjacent its respective inlet and outlet ports, all of said projections being V-shaped and substantially the same size;

coupling members provided between adjacent ones of the filter, regulator and lubricator, each said coupling member defining an air passage for alignment between the outlet port of one of the filter, regulator and lubricator and the inlet port of the next adjacent one of the filter, regulator and lubricator, each said coupling member further including a pair of threaded bores extending generally transversly of the axis of its said air passage, the threaded bores opening generally in opposite directions;

striding members for engaging the projections of adjacent ones of the filter, regulator and lubricator, each said striding member including a pair of leg portions, each said leg portion having a V-shaped region complementarily configured to the V-shaped regions of the projections and adjacent ones of the filter, regulator and lubricator, each said striding member further including a center portion for joining the two leg portions, each said center portion including means defining a hole for alignment with a respective one of said threaded bores of a respective one of said coupling members when adjacent ones of the filter, regulator and lubricator are assembled with the respective coupling member between them, an O-ring between the respective coupling members and the adjacent ones of the filter, regulator and lubricator, and said striding members being positioned on at least two sides of the assembly with the V-shaped regions of the striding members engaging respective V-shaped regions of the projections on the adjacent ones of the filter, regulator and lubricator and bolts capturing the respective striding member center portions and engaging with a respective one of said threaded bores in the coupling members, the V-shaped regions of each one of said striding members being inclined away from each other so that the adjacent ones of the filter, regulator and lubricator are pulled together to compress the O-rings and seal the air passages as the bolts are tightened.

2. A three-unit assembly for a pneumatic circuit according to claim 1, wherein each said air passage defining portion extends upwardly from a horizontal flat portion of the respective filter, regulator or lubricator to define a stepped region between the horizontal flat portion and the air passage defining portion.

3. A three-unit assembly for a pneumatic circuit according to claim 1, wherein each said V-shaped region includes a peak portion and two surfaces which extend away from the peak portion and slope generally away from each other, and each said V-shaped region includes a crease and two surfaces which extend away from the crease and slope toward each other generally.

4. A three-unit assembly for a pneumatic circuit according to claim 3, wherein the pair of projections at each one of said inlet and outlet ports are symmetrically located to extend generally radially outward diametrically from each other across the axis of the inlet and outlet ports and the two surfaces of each said projection extend generally symmetrically from the peak portion thereof.

* * * * *